United States Patent
Kim et al.

(10) Patent No.: US 8,460,828 B2
(45) Date of Patent: Jun. 11, 2013

(54) ELECTROLYTE ASSEMBLY FOR SECONDARY BATTERY OF NOVEL LAMINATED STRUCTURE

(75) Inventors: KiJae Kim, Seoul (KR); Min Su Kim, Daejeon (KR); Hey Woong Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 330 days.

(21) Appl. No.: 12/301,006

(22) PCT Filed: May 4, 2007

(86) PCT No.: PCT/KR2007/002193
§ 371 (c)(1),
(2), (4) Date: Apr. 29, 2009

(87) PCT Pub. No.: WO2007/132994
PCT Pub. Date: Nov. 22, 2007

(65) Prior Publication Data
US 2010/0015529 A1    Jan. 21, 2010

(30) Foreign Application Priority Data

May 15, 2006    (KR) ........................ 10-2006-0043194

(51) Int. Cl.
*H01M 4/00* (2006.01)
*H01M 10/04* (2006.01)
(52) U.S. Cl.
USPC ............. 429/246; 429/94; 429/127; 429/149; 429/152; 429/153; 429/247
(58) Field of Classification Search
USPC ................... 429/94, 127, 128, 149, 152, 153, 429/246, 247
See application file for complete search history.

(56) References Cited

U.S. PATENT DOCUMENTS

| | | | | |
|---|---|---|---|---|
| 5,147,737 | A | * | 9/1992 | Post et al. ........................ 429/94 |
| 5,300,373 | A | * | 4/1994 | Shackle ......................... 429/152 |
| 5,478,668 | A | * | 12/1995 | Gozdz et al. .................. 429/127 |

(Continued)

FOREIGN PATENT DOCUMENTS

| CN | 2713657 Y | 7/2005 |
|---|---|---|
| JP | 1-274364 A | 11/1989 |

(Continued)

OTHER PUBLICATIONS

Abstract Only for KR-1020000051741-A, Date = Aug. 16, 2000.

*Primary Examiner* — Ula C Ruddock
*Assistant Examiner* — Amanda Barrow
(74) *Attorney, Agent, or Firm* — Birch, Stewart, Kolasch & Birch, LLP

(57) ABSTRACT

Disclosed herein is an electrode assembly for secondary batteries, wherein the electrode assembly is constructed in a structure in which a cathode, having an active material layer coated on one major surface of a current collector, and an anode, having an active material layer coated on one major surface of another current collector, are bent in a zigzag fashion in vertical section, and the cathode and the anode are fitted to each other, such that the electrode active material layers face each other, while a separator is disposed between the cathode and the anode. The electrode assembly according to the present invention has the effect of simplifying a process for manufacturing a battery, thereby reducing the manufacturing costs and the manufacturing time, and therefore, improving the productivity.

11 Claims, 6 Drawing Sheets

U.S. PATENT DOCUMENTS

| | | | |
|---|---|---|---|
| 5,498,489 A * | 3/1996 | Dasgupta et al. | 429/152 |
| 6,287,721 B1 * | 9/2001 | Xie et al. | 429/152 |
| 6,423,449 B1 * | 7/2002 | Hong | 429/231.95 |
| 6,461,762 B1 * | 10/2002 | Yang et al. | 429/127 |
| 6,740,446 B2 | 5/2004 | Corrigan et al. | |
| 6,780,207 B1 * | 8/2004 | Han et al. | 29/623.3 |
| 2002/0160263 A1 * | 10/2002 | Corrigan et al. | 429/209 |
| 2003/0072996 A1 | 4/2003 | Roh | |
| 2005/0048361 A1 * | 3/2005 | Wang et al. | 429/130 |
| 2006/0105233 A1 | 5/2006 | Morita | |

FOREIGN PATENT DOCUMENTS

| | | |
|---|---|---|
| JP | 2001-160393 A | 6/2001 |
| JP | 2002-343342 A | 11/2002 |
| JP | 2003-92144 A | 3/2003 |
| KR | 1020010082058 A | 8/2001 |
| KR | 1020010082059 A | 8/2001 |
| KR | 1020010082060 A | 8/2001 |
| WO | WO-03/034517 A1 | 4/2003 |

* cited by examiner

10

Conventional Art

ELECTROLYTE ASSEMBLY FOR SECONDARY BATTERY OF NOVEL LAMINATED STRUCTURE

FIELD OF THE INVENTION

The present invention relates to an electrode assembly, having a novel laminated structure, for secondary batteries, and, more particularly, to an electrode assembly for secondary batteries, wherein the electrode assembly is constructed in a structure in which a cathode, having an active material layer coated on one major surface of a current collector, and an anode, having an active material layer coated on one major surface of another current collector, are bent in a zigzag fashion in vertical section, and the cathode and the anode are fitted to each other, such that the electrode active material layers face each other, while a separator is disposed between the cathode and the anode.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and voltage, extended cycle life, and low self discharge rate, which has been commercialized and widely used.

Based on the construction of electrodes and an electrolyte, the lithium secondary battery may be classified as a lithium-ion battery, a lithium-ion polymer battery, or a lithium polymer battery. Among them, the lithium-ion polymer battery has been increasingly used because the lithium-ion polymer battery has a low possibility of electrolyte leakage, is lightweight, is manufactured with low costs, and can be easily constructed in various shapes.

An electrode assembly having a cathode/separator/anode structure, which constitutes a secondary battery, may be generally classified as a jelly-roll (winding) type electrode assembly or a stacking type electrode assembly, based on the structure of the electrode assembly. The jelly-roll type electrode assembly is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and helically winding the anode/separator/cathode structure. The jelly-roll type electrode assembly is suitable for cylindrical batteries; however, the jelly-roll type electrode assembly is not suitable for prismatic batteries or pouch-shaped batteries because the electrode active material may be detached, and the spatial utilizability is low. On the other hand, the stacking type electrode assembly is an electrode assembly constructed in a structure in which pluralities of unit cathodes and anodes are sequentially stacked one on another. The stacking type electrode assembly has an advantage in that the stacking type electrode assembly can be constructed in a prismatic structure; however, the stacking type electrode assembly has disadvantages in that a process for manufacturing the stacking type electrode assembly is complicated and troublesome, and, when external impacts are applied to the stacking type electrode assembly, electrodes of the stacking type electrode assembly are pushed with the result that short circuits occur in the stacking type electrode assembly.

In order to solve the above-described problems, there has been developed an overlapping type electrode assembly, i.e., an electrode assembly constructed in a structure in which full cells having a cathode/separator/anode structure of a predetermined unit size or bicells having a cathode (anode)/separator/anode (cathode)/separator/cathode (anode) structure of a predetermined unit size are sequentially stacked one on another, such that the cathodes face the corresponding anodes, while a long continuous separator sheet is disposed between the full cells or the bicells. Examples of such an overlapping type electrode assembly are disclosed in Korean Patent Application Publication No. 2001-82058, No. 2001-82059, and No. 2001-82060, which have been filed in the name of the applicant of the present patent application. The structure of the overlapping type electrode assembly is clearly shown in FIGS. 1 and 2, which are typical views illustrating a process for manufacturing the overlapping type electrode assembly.

Referring to FIGS. 1 and 2, the overlapping type electrode assembly 10 is manufactured through several steps, i.e., a step of cutting cathodes 1, an anode 2, and separators 5 such that the cathodes 1, anode 2, and separators 5 have a predetermined size, a step of sequentially stacking the cut cathodes 1, anode 2, and separators 5 to manufacture a bicells (or full cells), a step of folding a plurality of bicells 6 using a separation film 7, and a step of electrically connecting electrode taps 3 and 4 protruding from one-side ends of the cathodes 1 and the anodes 2. Consequently, the manufacturing process is complicated, and therefore, the manufacturing costs and manufacturing time are increased. In addition, an additional connecting member is essentially used at the step of the connecting the electrode taps 3 and 4, and a troublesome work, such as welding, is required. Consequently, the manufacturing costs are further increased, and a possibility of battery defect is increased.

In this connection, there has been proposed a method of manufacturing an electrode assembly into a zigzag type overlapping structure in vertical section instead of the stacking or overlapping structure.

For example, Japanese Patent Application Publication No. 2001-160393 discloses a method of folding a separator sheet, while cathodes and electrode stack units, such as bicells or full cells, are attached to the separator sheet, in a zigzag fashion to manufacture an electrode assembly. However, this manufacturing method requires a step of manufacturing the electrode stack units and a step of arranging the electrode stack units on the separator sheet, like the overlapping electrode assembly. Consequently, this manufacturing method has fundamental limits.

In addition, Korean Patent Application Publication No. 2000-51741 discloses a method of constructing electrode sheets and a separator into a stacking structure having a cathode/separator/anode arrangement and folding the stacking structure in a zigzag fashion to manufacture an electrode assembly. This manufacturing method has an advantage in that this manufacturing method is very simple as compared to the manufacturing method disclosed in the above-mentioned Japanese patent application publication. However, the stacking structure having the cathode/separator/anode arrangement has a specific thickness with the result that it is very difficult to fold the stacking structure in the zigzag fashion. Furthermore, electrode active material layers may be separated from electrode current collectors when a force is applied to the stacking structure such that the stacking structure is folded.

Therefore, there is a high necessity for a technology to fundamentally solve the above-mentioned problems.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a cathode and anode are previously bent in a zigzag fashion in vertical section, and the bent cathode and anode are fitted to each other, such that electrode active material layers face each other, while a separator is disposed between the bent cathode and anode, to manufacture an electrode assembly, it is possible to simplify a process for manufacturing a battery, whereby the manufacturing costs and manufacturing time are reduced, and therefore, the productivity is improved. The present invention has been completed based on these findings.

In accordance with one aspect of the present invention, the above and other objects can be accomplished by the provision of an electrode assembly for secondary batteries, wherein the electrode assembly is constructed in a structure in which a cathode, having an active material layer coated on one major surface of a current collector, and an anode, having an active material layer coated on one major surface of another current collector, are bent in a zigzag fashion in vertical section, and the cathode and the anode are fitted to each other, such that the electrode active material layers face each other, while a separator is disposed between the cathode and the anode.

The electrode assembly constructed as described above has an advantage in that the electrode assembly can be easily manufactured through a very simple process for bending the cathode and the anode into a predetermined shape and fitting the cathode and the anode to each other such that the cathode and the anode overlap with each other.

In order to easily bend the cathode, having the active material layer coated on the current collector, which is made of metal, and the anode, having the active material layer coated on the current collector, which is made of metal, and to prevent the increase in thickness of the electrode assembly in the folded regions, the present invention proposes various structures, which will be described below in detail.

The "folded regions" are edge regions formed by bending the electrodes in a zigzag fashion. The folded regions are arranged at predetermined intervals in the direction in which the electrodes are bent (bending direction). The width of the electrode assembly is decided based on the distance between two neighboring folded regions.

In a preferred embodiment, markings for enabling the electrodes to be easily bent are provided at folded regions. Specifically, the markings are formed on the current collectors of the electrodes. For example, the markings may include a plurality of holes spaced at predetermined intervals along the folded regions.

In another preferred embodiment, an active material is not applied to the folded regions or the active material is applied thinly to the folded regions, whereby the bending of the electrodes is easily accomplished, and the increase in thickness of the electrode assembly at the folded regions is prevented. The folded regions may be formed by applying active material layers to the current collectors using a pattern coating method.

In the electrode assembly according to the present invention, the separator is a thin porous film made of an insulative material. The separator may be thermally welded to the active material layer of the cathode or the anode before the electrodes are bent, in consideration of a fact that the treatment of the separator is not easy during the manufacture of the electrode assembly.

Generally, the stacking type electrode assembly includes a plurality of separate electrodes. Consequently, an electrode tap protrudes one-side ends or both-side ends of the current collectors of the electrodes, such that the electrodes are combined to each other and connected to an external circuit, and no active material is coated on the electrode taps.

According to the present invention, on the other hand, a single current collector is bent to form a plurality of overlapped electrodes. Preferably, a predetermined size of the active material layer is not coated at one side or both sides of each electrode such that electrode leads can be attached to the corresponding electrodes so as to accomplish the electrical connection, although a plurality of electrode taps may be formed for the respective bent electrodes.

The electrode assembly according to the present invention may be modified in various shapes, which will be described below in detail.

As a first modification, the electrode assembly may be constructed in a structure in which the separator extends with a size equivalent to a multiple of the width of each electrode in the longitudinal direction (lateral direction) perpendicular to the bending direction, a plurality of electrodes are fitted to each other, while the separator is disposed between the electrodes, in the longitudinal direction of the separator, and is then folded in the longitudinal direction of the separator.

As a first modification, the electrode assembly may be constructed in a structure in which the separator extends longer than the length of each electrode in the widthwise direction perpendicular to the bending direction, the electrodes are fitted to each other, while the separator is disposed between the electrodes, and the extension of the separator covers the outer surfaces of the fitted electrodes. In this case, the electrodes are preferably fitted to the remaining regions of the separator excluding the extension.

In accordance with another aspect of the present invention, there is provided a secondary battery including the electrode assembly having the above-stated construction.

Preferably, the secondary battery according to the present invention is a lithium-ion polymer battery. Components constituting the lithium-ion polymer secondary battery and a method of manufacturing the lithium-ion polymer secondary battery are well known in the art to which present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
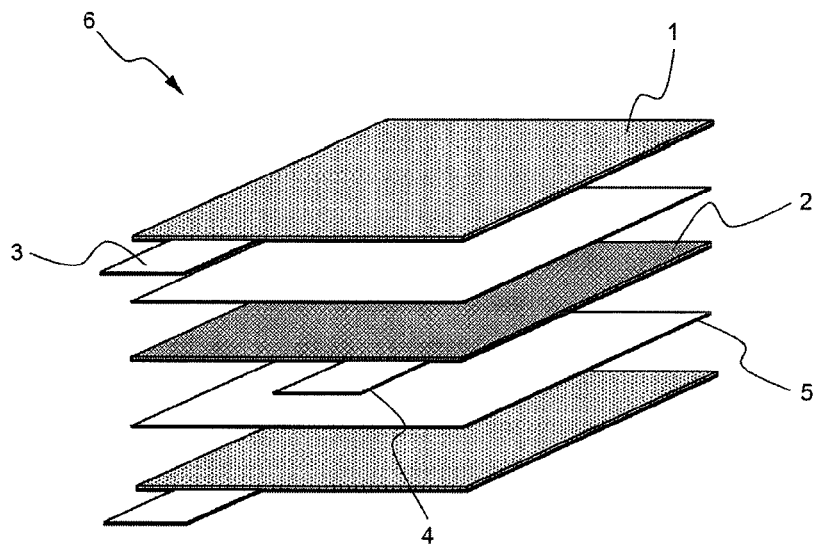
FIGS. 1 and 2 are typical views illustrating a process for manufacturing a conventional overlapping type electrode assembly.
Figure 2:
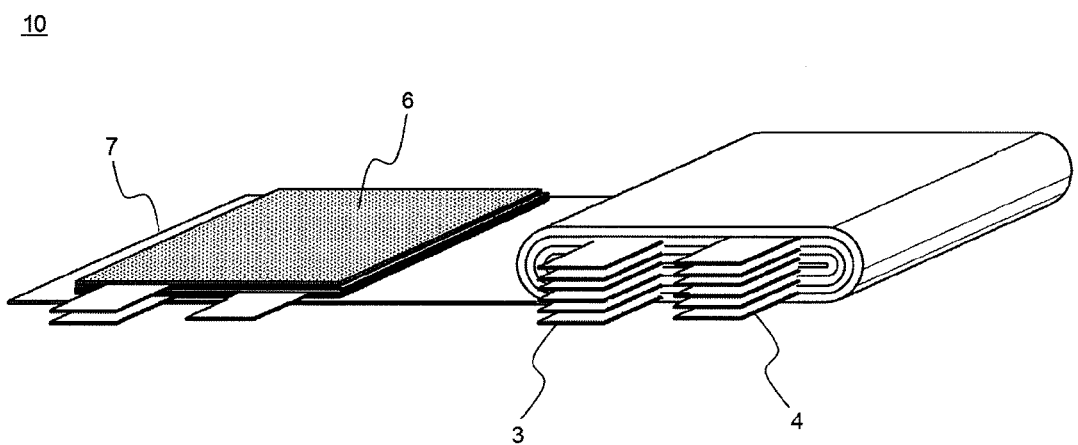
Figure 3:
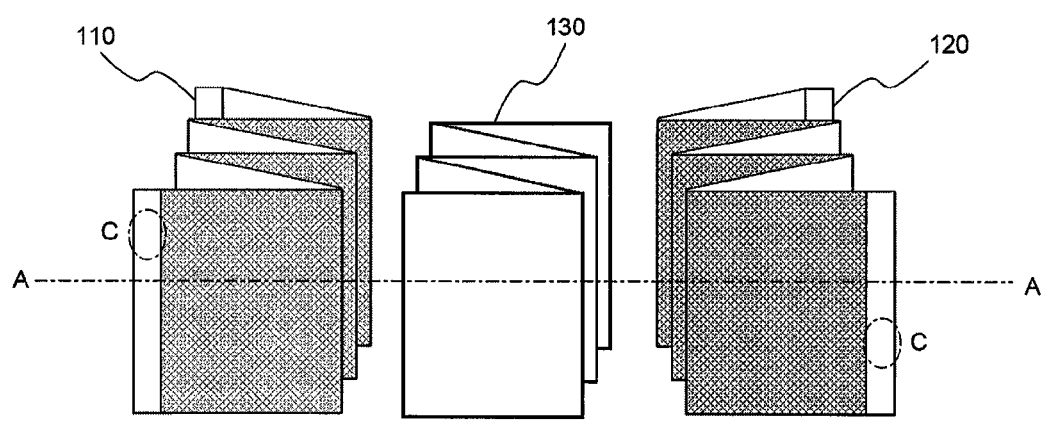
FIG. 3 is a typical view illustrating an electrode assembly according to a preferred embodiment of the present invention before the electrode assembly is assembled.
Figure 4:
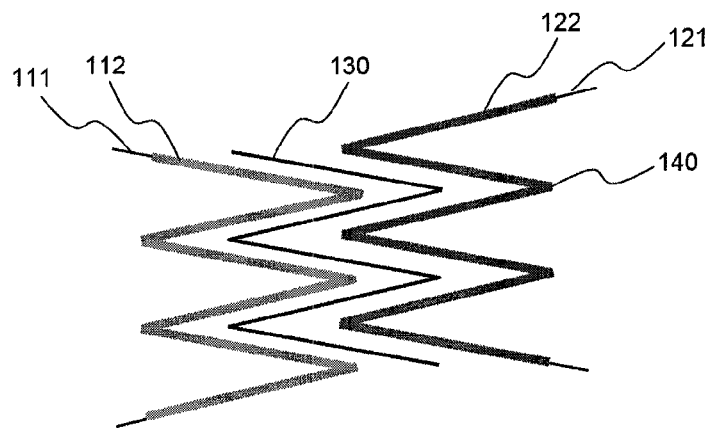
FIG. 4 is a vertical sectional view taken along line A-A of FIG. 3 after the electrode assembly is assembled.

FIG. 3 is a typical view illustrating an electrode assembly according to a preferred embodiment of the present invention before the electrode assembly is assembled, and FIG. 4 is a vertical sectional view taken along line A-A of FIG. 3 after the electrode assembly is assembled.

Referring to these drawings, the electrode assembly 100 is constructed in a structure in which a cathode 110, having an active material layer 112 coated on one major surface of a current collector 111, and an anode 120, having an active material layer 122 coated on one major surface of a current collector 121, are bent in a zigzag fashion in vertical section, and the cathode 110 and the anode 120 are fitted to each other, such that the electrode active material layers 112 and 122 face each other, while a separator 130, which is bent in the same shape as the cathode 110 and the anode 120, is disposed between the cathode 110 and the anode 120. The separator 130 may be bent in the same shape as the cathode 110 and the anode 120 before the cathode 110 and the anode 120 are fitted to each other. Alternatively, the assembly process may be carried out such that the separator 130 is not previously bent but naturally bent at the step of fitting the cathode 110 and the anode 120 in consideration of the flexible film characteristics of the separator 130.

At ends of the cathode 110 and the anode 120 are formed extensions C to which electrode leads (not shown) are to be attached to accomplish the electrical connection. No active material is coated on the current collectors 111 and 121 at the extensions C.

Also, the cathode 110 and the anode 120 are composed of metal current collectors 111 and 121, respectively. The metal current collectors 111 and 121 are not easily bent with the result that folded regions 140 may be modified in various shapes. The structure of the folded regions may be confirmed from FIGS. 4 and 5, which are plan views illustrating examples of an electrode.

Figure 5:
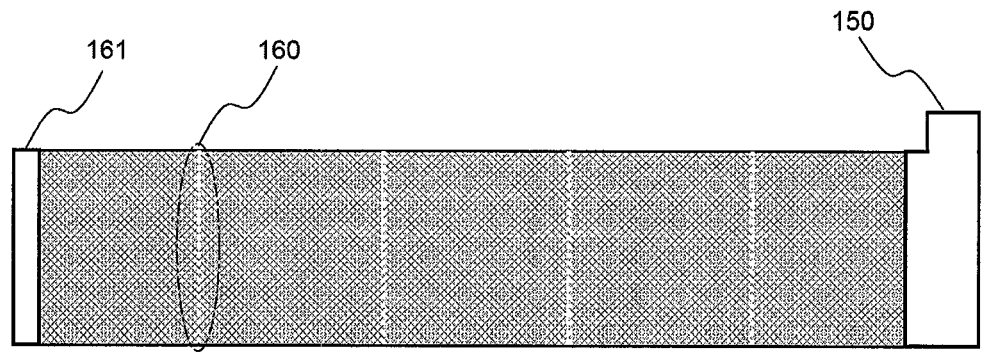
FIG. 5 is a plan view illustrating an example of an electrode that can be used in the electrode assembly of FIG. 3.
Figure 6:
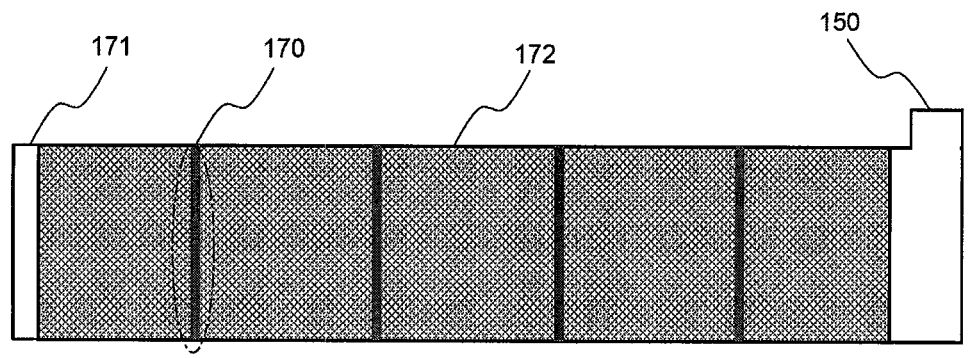
FIG. 6 is a plan view illustrating another example of an electrode that can be used in the electrode assembly of FIG. 3.

Referring to FIGS. 4 and 5, the folded regions may be provided with markings 160 including a plurality of holes spaced at predetermined intervals along the folded regions on a current collector 161 of the electrode or regions where an active material does not exist or is applied thinly when an active material layer 172 is coated on a current collector 171.

Figure 7:
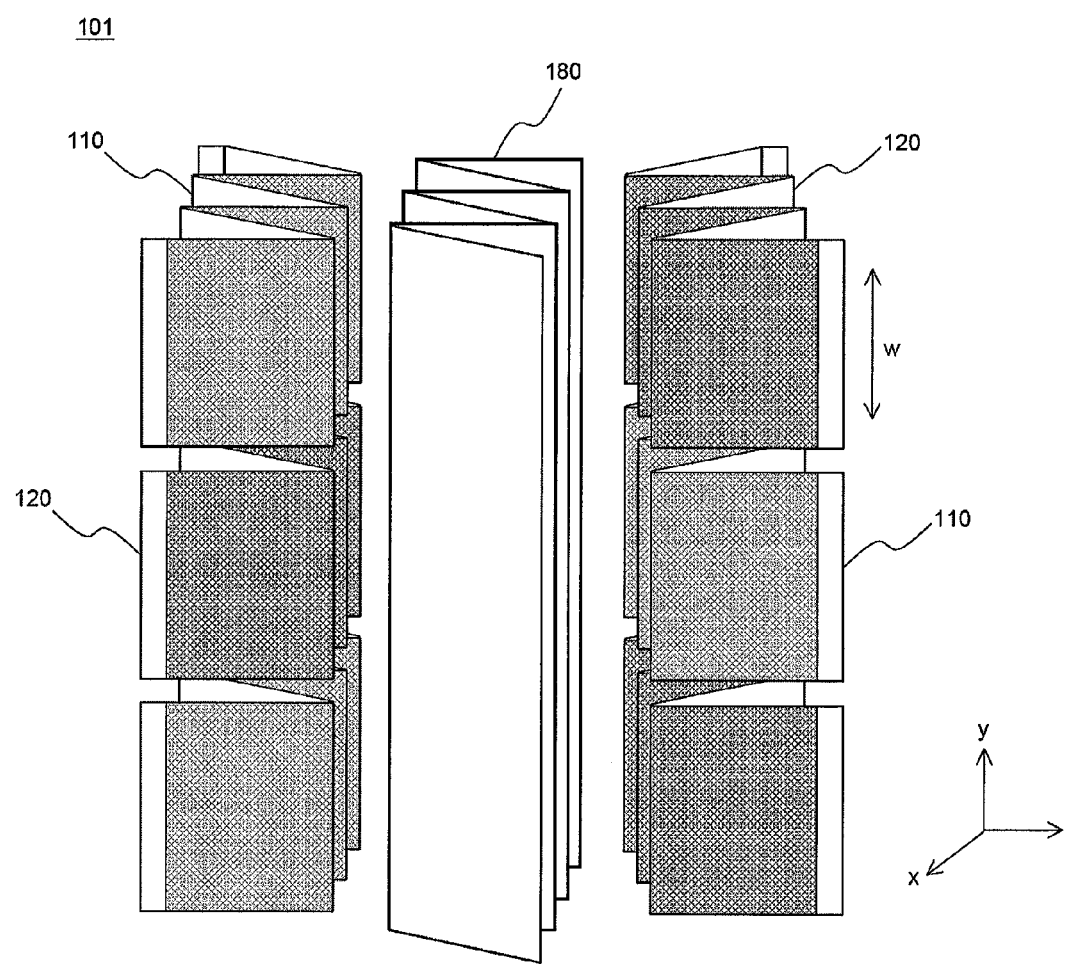
FIG. 7 is a typical view illustrating an electrode assembly according to another preferred embodiment of the present invention before the electrode assembly is assembled.
Figure 8:
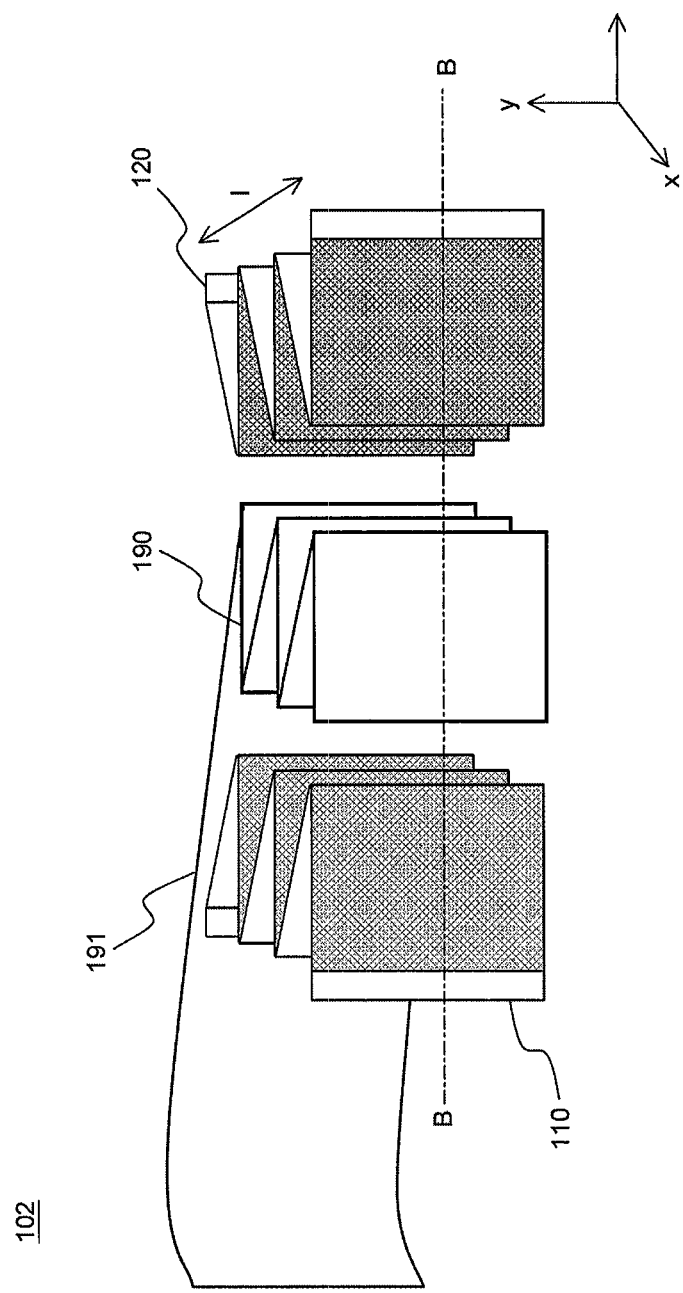
FIG. 8 is a typical view illustrating an electrode assembly according to a further embodiment of the present invention before the electrode assembly is assembled.

FIG. 7 is a typical view illustrating an electrode assembly according to another preferred embodiment of the present invention before the electrode assembly is assembled, and FIG. 8 is a typical view illustrating an electrode assembly according to a further embodiment of the present invention before the electrode assembly is assembled.

Referring first to FIG. 7, the electrode assembly 101 includes a separator 180 having a size three times the width w of the electrode in the longitudinal direction y perpendicular to the bending direction x. Also, the electrode assembly 101 is constructed in a structure in which three cathodes 110 and three anodes 120 are fitted to each other in the longitudinal direction y, while the separator 180 is disposed between the cathodes 110 and the corresponding anodes 120, as in FIG. 3. The electrode assembly 101 may be folded in the longitudinal direction y based on the width w of the electrode. In the case that the cathodes 110 and the anodes 120 are alternately arranged in the longitudinal direction y as shown in the drawing, the cathodes 110 and the anodes 120 may be bent in a zigzag fashion, such that electrodes having opposite polarities face each other, when the electrode assembly 101 is folded in the longitudinal direction y. At this time, the separator 180 extends into a length sufficient for the separator 180 to be further bent half time more than the separator of FIG. 3 such that the separator 180 is disposed between the cathodes 110 and the anodes 120, which are bent in the longitudinal direction y.

Figure 9:
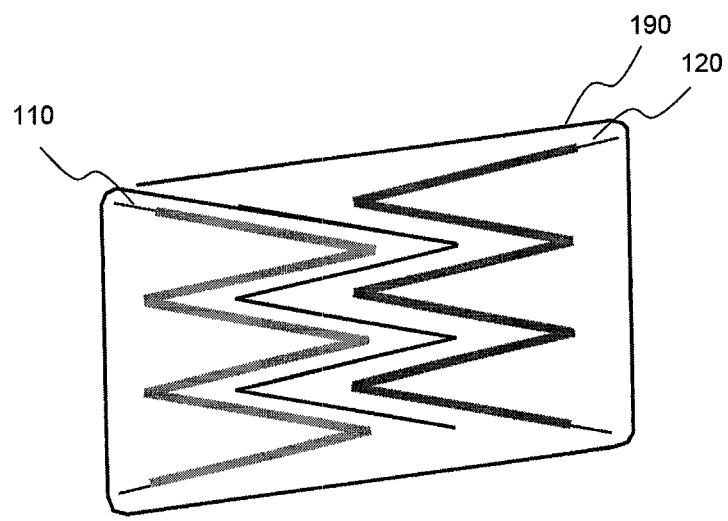
FIG. 9 is a vertical sectional view taken along line B-B of FIG. 8 after the electrode assembly is assembled.

Referring to FIG. 8, the electrode assembly 102 includes a separator 190 extending longer than the length l of an electrode in the bending direction x. Also, the electrode assembly 102 is constructed in a structure in which a cathode 110 and a anode 120 are fitted to each other, while the separator 190 is disposed between the cathodes 110 and the corresponding anodes 120, as in FIG. 3, and the outer surfaces of the electrodes 110 and 120 are covered using an extension 191 of the separator 190. The detailed structure of the electrode assembly 102 is easily confirmed from FIG. 9, which is a vertical sectional view taken along line B-B of FIG. 8 after the electrode assembly is assembled.

Hereinafter, examples of the present invention will be described in more detail. It should be noted, however, that the scope of the present invention is not limited by the illustrated examples.

Example 1

A cathode mixture slurry was prepared by adding 95 weight percent of $LiCoO_2$ as a cathode active material, 2.5 weight percent of Super-P (a conducting agent), and 2.5 weight percent of PVdf (a coupling agent) to N-methyl-2-pyrrolidone (NMP) as a solvent. As shown in FIG. 4, the cathode mixture slurry was coated on one major surface of an aluminum foil having markings formed thereon, and was then dried and pressed to manufacture a cathode.

An anode mixture slurry was prepared by adding 95 weight percent of artificial graphite as an anode active material, 2.5 weight percent of Super-P (a conducting agent), and 2.5 weight percent of PVdf (a coupling agent) to NMP as a solvent. As shown in FIG. 4, the anode mixture slurry was coated on one major surface of a copper foil having markings formed thereon, and was then dried and pressed to manufacture an anode.

Cell Guard™ was used as a separator. The cathodes and the anodes were bent in a zigzag fashion in vertical section along the marking regions thereof. The separator was also bent in the same shape as the cathodes and the anodes. The cathodes and the anodes were fitted to each other, such that the active material layers of the cathodes and the anodes faced each other, while the separator was disposed between the cathodes and the anodes, to manufacture an electrode assembly. The manufactured electrode assembly was mounted in a battery case, and then an electrolyte was injected into the battery case, whereby a battery was finally completed.

Comparative Example 1

A battery was manufactured in the same manner as Example 1 except that a cathode and an anode were stacked one on another, while a separator was disposed between the cathode and the anode, and the stacked cathode, anode, and separator were bent in a zigzag fashion, to manufacture an electrode assembly.

Experimental Example 1

10 batteries were manufactured according to Example 1 and 10 batteries were manufactured according to Comparative example 1. During the manufacture of the batteries, the amount of solid powder separated from the cathode and the anode was measured. The results revealed that the amount of solid powder separated from the cathode and the anode during the manufacture of the batteries according to Comparative example 1 was on the average 180 percent of the amount of solid powder separated from the cathode and the anode during the manufacture of the batteries according to Example 1. The analysis of the separated solid powder revealed that the separated solid powder included the electrode active material, the coupling agent, and the conducting agent. The analysis of the separated solid powder also revealed that a relatively large amount of electrode active material was separated from the cathode and the anode during the manufacture of the batteries according to Comparative example 1.

In addition, 300-cycle charge and discharge tests were carried out with respect to the batteries manufactured as described above to measure the swelling phenomenon (the extension degree) of the batteries. The results revealed that a relatively large swelling phenomenon occurred in four batteries among the batteries manufactured according to Comparative example 1. It may be inferred from the results that the stacking and bending of the cathode, anode, and separator were not accurately performed during the manufacture of the batteries according to Comparative example 1. It is difficult to accurately bend the electrode assembly, having a predetermined size, of the cathode/separator/anode structure at desired positions, whereby a possibility that the above-described mismatching phenomenon occurs when using the method according to Comparative example 1 is very strong.

INDUSTRIAL APPLICABILITY

As apparent from the above description, the electrode assembly according to the present invention has the effect of simplifying a process for manufacturing a battery, thereby reducing the manufacturing costs and the manufacturing time, and therefore, improving the productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode assembly, comprising:
  a cathode electrode, having an active material layer coated on one major surface of a current collector, wherein the cathode is bent in a zigzag fashion in vertical sections to form folded regions in the cathode,
  an anode electrode, having an active material layer coated on one major surface of another current collector, wherein the anode is bent in a zigzag fashion in vertical sections to form folded regions in the anode,
  wherein the bent cathode and the bent anode are fitted to each other, such that the electrode active material layers face each other,
  and a separator disposed between the cathode and the anode,
  wherein the separator extends with a size equivalent to a multiple of the width of each electrode in a longitudinal direction perpendicular to the bending direction, and a plurality of the cathode electrodes and a plurality of the anode electrodes are fitted to each other along the length of the separator in the longitudinal direction and then folded.

2. The electrode assembly according to claim 1, wherein the current collectors of the electrodes are provided with markings in said folded regions, wherein said markings are configured to enable the current collectors to be easily bent to form the folds.

3. The electrode assembly according to claim 1, wherein the active material layers of the electrodes are coated in a pattern such that an active material does not exist on the folded regions or the active material is applied thinly to the folded regions.

4. The electrode assembly according to claim 1, wherein the separator is thermally welded to the active material layer of the cathode or the anode before the electrodes are bent.

5. The electrode assembly according to claim 1, wherein a predetermined size of the active material layer is not coated at one side or both sides of each electrode such that electrode leads can be attached to the corresponding electrodes.

6. The electrode assembly according to claim 1, wherein the separator extends longer than the length of each electrode in a widthwise direction perpendicular to the bending direction, and the extension of the separator covers outer surfaces of the fitted electrodes.

7. A secondary battery comprising the electrode assembly according to claim 1.

8. The secondary battery according to claim 7, wherein the battery is a lithium-ion polymer battery.

9. The electrode assembly according to claim 2, wherein each of markings includes a plurality of holes spaced at a predetermined interval along each of the folded regions.

10. An electrode assembly, comprising:
  a cathode electrode, having an active material layer coated on one major surface of a current collector, wherein the cathode is bent in a zigzag fashion in vertical sections to form folded regions in the cathode,
  an anode electrode, having an active material layer coated on one major surface of another current collector, wherein the anode is bent in a zigzag fashion in vertical sections to form folded regions in the anode,
  wherein the bent cathode and the bent anode are fitted to each other, such that the electrode active material layers face each other,
  and a separator disposed between the cathode and the anode,
  wherein the separator extends with a size equivalent to three times the width of each electrode in a longitudinal direction perpendicular to the bending direction, and a plurality of the cathode electrodes and a plurality of the anode electrodes are fitted to each other along the length of the separator in the longitudinal direction and then folded.

11. A secondary battery comprising the electrode assembly according to claim 10.

* * * * *